United States Patent [19]

Gartner

[11] 4,420,590

[45] Dec. 13, 1983

[54] BACTERIOCIDAL RESINS AND DISINFECTION OF WATER THEREWITH

[75] Inventor: William J. Gartner, Bartlett, Ill.

[73] Assignee: Halex, Inc., Streamwood, Ill.

[21] Appl. No.: 251,337

[22] Filed: Apr. 6, 1981

[51] Int. Cl.$^3$ .......................... B01J 41/12; C08F 8/20
[52] U.S. Cl. .................................... 525/357; 210/754; 210/764; 521/31; 525/326.1; 525/328.2; 525/330.3; 525/333.3
[58] Field of Search .................. 521/31; 525/339, 357

[56] References Cited

U.S. PATENT DOCUMENTS 3,817,860 6/1974 Lambert ............................ 210/753
4,187,183 2/1980 Hatch ................................. 424/150
4,190,529 2/1980 Hatch ................................. 210/668

*Primary Examiner*—Joseph L. Schofer
*Assistant Examiner*—Peter F. Kulkosky
*Attorney, Agent, or Firm*—Robert E. Wagner; Ralph R. Rath

[57] ABSTRACT

Novel strongly basic anion-exchange resins substantially loaded with controlled relative proportions of iodide-bromide polyhalides whereby, when water is passed therethrough which is contaminated with bacteria, potable drinkable water is obtained for safe and effective usage in public water supply systems for relatively prolonged periods of time.

4 Claims, No Drawings

BACTERIOCIDAL RESINS AND DISINFECTION OF WATER THEREWITH

BACKGROUND OF THE INVENTION

It has heretofore been known to the art of water treatment to effect disinfection and reduction in the bacterial content thereof to treat contaminated water, for drinking purposes, for use in swimming pools and for other purposes and in other environments, by passing the same through strong base polyhalide bacteriocidal anion-exchange resins in which the exchange sites of said anion-exchange resins have attached to a predominant number of such sites polyhalide anions, notably triiodide ions, satisfying certain formulae conditions. After suitable preparations of such polyhalide bacteriocidal resins, the contaminated or possibly contaminated water to be treated is passed therethrough to effect decontamination or disinfection thereof.

Among the prior art references which disclose procedures following the approaches which have been referred to above are U.S. Pat. Nos. 3,817,860; 4,187,183; 4,190,529; and published articles appearing in Proceedings Second World Congress, International Water Resources Association, New Delhi, India, December, 1975, Vol. II, pp. 53–59; and Applied Microbiology, Nov. 1970, Vol. 20, No. 5, pp. 720–722.

In U.S. Pat. No. 4,187,183, it has been suggested, generally, that, in the production of the mixed-form polyhalide bacteriocidal resin, there be added to a strong base anion exchange resin a slurry mixture of elemental iodine, interhalogen, or bromine and an appropriate amount of an iodide or bromide salt, and it is pointed out that the preferred amount of iodide or bromide is less than the stoichiometric amount required for complete loading of triiodide or tribromide ions on all available resin sites, and the $X_2:X^-$ ratio is always greater than one. It points out, further, that iodine or bromine liberated from such bacteriocidal resins during water treatment by the passage of water therethrough may be readily scavenged from said treated water by an unloaded anion-exchange resin, and the hypohalous acid which is formed can be removed by additional treatment with activated charcoal. In the description of the preferred embodiment of the invention of said U.S. Pat. No. 4,187,183, the strong base anion-exchange resin, in chloride or sulfate form, is reacted with a mixture of iodine and a pre-selected amount of iodide salt to form a polyhalide resin product but, while the use of iodine and an iodide salt is thereafter discussed as indicative of the particularly advantageous embodiment of the invention of said patent, bromide or an appropriate interhalogen may be substituted for iodine, and that a bromide salt may be substituted for the iodide salt to produce other resins which are within the scope of the invention of said patent. The particular results obtained and reported are, however, as noted above, directed to the use of iodine and potassium iodide in the production of the polyhalide bacteriocidal resin, and the formulae stated in the claims of said patent are likewise defined in relation to the exchange sites and related facets in terms of the use of iodine and potassium iodide in the production of the polyhalide bacteriocidal resins. Similar disclosures and reports of results appear in U.S. Pat. No. 4,190,529.

The earlier U.S. Pat. No. 3,817,860 also discloses the preparation and utilization of a strongly basic anion-exchange resin containing combined triiodide in insolubilized form in said resin, and the disinfection of contaminated or bacteria-containing water by passage through a bed of a porous granular material or beads comprising said previously prepared triiodide strongly basic anion-exchange resin. The aforesaid U.S. Pat. No. 3,817,860 also refers to an earlier U.S. Pat. No. 3,316,173 in which water is treated with bromine and wherein a strong base anion-exchange resin is used as a source of diatomic or elemental bromine, the bromine being eluted from the resin to form a relatively concentrated aqueous solution, which is subsequently mixed with a larger volume of water, such as the water in a swimming pool, to provide a bacteriocidal concentration of bromine. In accordance with the teachings of U.S. Pat. No. 3,316,173, the bromine is eluted from the resin in concentration of from 10 to 10,000 p.p.m., which is stated to be far above physiologically acceptable levels of bromine in water for human consumption.

Still another prior art disclosure dealing with the treatment of water to effect disinfection thereof or to control microorganisms therein in U.S. Pat. No. 3,462,363. This patent refers to U.S. Pat. No. 3,316,173 and points out that, because the residual halogen picked up by water treated by strong base quaternary ammonium anion-exchange resins in polybromide form, prepared pursuant to the aforementioned U.S. Pat. No. 3,316,173, or in strong base quaternary ammonium anion-exchange resins in other previously known polyhalide forms, is unduly high, as is directly indicated in U.S. Pat. No. 3,462,363, to effect substantial reduction in the content of residual halogen in the finally treated water, said U.S. Pat. No. 3,462,363 finds it necessary to resort to a two-step or tandem treatment with a strong base quaternary ammonium anion-exchange resin in a polyhalide form, namely, the scavenging resin.

As will be seen below, in light of the description of my present invention, and the purposes and objects of my invention, such are readily distinguished from the disclosures in the aformentioned patents. As will also be pointed out below, the teaching and disclosures of the aforementioned U.S. Pat. Nos. 3,817,860; 4,187,183; 4,190,529; 3,316,173 and 3,462,363, as well as the published articles referred to above which deal with experimental work related to U.S. Pat. No. 3,817,860, fail to provide any teachings of my present invention and the advantages that are achieved thereby over the disclosures of said prior art references taken singly or as a whole.

By way of further background information, relevant to my present invention, it has been known, generally speaking, that under certain limited conditions, while the U.S. Environmental Protection Agency (USEPA) approves of the use of iodine and also of bromine as drinking water disinfectants, up to the present time, policy statements in reference thereto which issued in 1973 by USEPA have remained fundamentally unchanged. Chlorination of water is regarded as a safe procedure and it is, and long has been, in common usage for public water supply as well as for general use. On the other hand, in the case of iodinated or brominated water for human usage for drinking purposes, the policy promulgated by USEPA in 1973 indicates that the presence of iodine or bromine in emergency situations in water supplies would be considered tolerable or not harmful where the consumption of iodinated or brominated water is brief, for instance, of the order of not more than about 3 weeks, and where the iodine or bromine content of the water is in the range of about 0.5 to 1.0 mg. of iodine or bromine per liter. In general, however, iodine disinfection of public water supplies is not recommended because of possible adverse effects on individuals with impaired thyroid function or on the unborn child. In any event, so fas as I am at present aware, no disinfecting systems heretofore have been developed, involving the use of iodine or bromine, which are acceptable and approved for long term or in-line usage for disinfecting water because the effluent from all known systems, of which I am aware, contains an unacceptably high level of residual iodine/iodide or bromine/bromide. Thus, while the disclosures of such prior patents as those referred to above, indicate or purport to meet USEPA conditions for long term usage, so far as I am aware they possess the deficiency that the effluents from the triiodide or polybromide strongly basic anion-exchange resins thereof still contain sufficient residual iodine/iodide or bromine which precludes their acceptability for use in public water supply systems, particularly where the treated water is intended for long term or in-line drinking purposes.

The ultimate design of an iodine or bromine bacteriocidal system would be a demand mechanism, i.e. bacteriocidal materials are released only as demanded by the presence of microorganisms in the water to be treated.

In the aforementioned U.S. Pat. Nos. 3,187,860; 4,187,183; 4,190,529, as discussed, in part, above, as well as in U.S. Pat. No. 3,923,665, methods are disclosed for making bacteriocidal resins and a formula is specified in said U.S. Pat. Nos. 4,187,183 and 4,190,529 which provides conditions to be satisfied for producing certain of such bacteriocidal resins. Generally speaking, over and above what has heretofore been stated in regard thereto, this formula centers around the use of potassium iodide (KI) and elemental iodine (I$_2$) to form "triiodide" ions that can be attached to a synthetic ion exchange resin. This is accomplished by preparing a stoichiometrically balanced solution of I$_2$ in KI. The resin is then stirred into the solution and allowed to react. The aforesaid U.S. Pat. Nos. 4,187,183 and 4,190,529 claim that the polyhalides, specifically triiodide, occupy certain resin sites as follows:

a is $I^-_3$— b is $I^-_5$ wherein:
a=0.4 to 0.8 of the exchange sites
b=0.1 to 0.3 of the exchange sites
a+b=a predominant number of the anion sites available for exhange and a+2 (b) equals or exceeds 1.0.

As has also previously been discussed above, reference is made in certain of said patents for the need to use a bed of scavenger resin downstream of the triiodide resin in order to cope with the relatively high levels of iodine/iodide in the effluent from the system, the scavenger resin serving to react with the excess iodine/iodide in order to remove it from water streams.

THE PRESENT INVENTION

In accordance with my present invention, novel polyhalide bacteriocidal strong base anion-exchange resins are produced which generate an effluent with extremely low iodine and bromine contents, or, in other words, the novel resins of my present invention are characterized by very low iodine and bromine residuals and they are "demand" bacteriocidal materials which rely solely on water contact with the resins to destroy microorganisms.

In the production of the novel polyhalide bacteriocidal resin compositions of my invention, a strong base anion-exhange resin, generally in the form of granules or beads, having anion-exchange sites, is advantageously contacted in an aqueous medium containing a solution of elemental iodine and water-soluble salts of iodine and of potassium bromide. While such water-soluble iodide salts may be sodium iodide or ammonium iodide, it is especially satisfactory to use potassium iodide. However, for the effective practice of my invention I have found it to be essential to utilize potassium bromide. Mixtures of the various water-soluble iodides can be used but, again, potassium iodide is especially satisfactory, and potassium bromide is essential.

The following examples are illustrative of the practice of my present invention. It will be understood that various changes may be made therein within the scope of the guiding principles and teachings disclosed herein, without departing from the fundamentals of my invention, and the invention is, therefore, not to be construed as being limited to said illustrative examples.

EXAMPLE 1

22.75 pounds of elemental iodine, 9.9 pounds of potassium iodide and 1.98 pounds of potassium bromide are mixed together. Then 4.94 pounds of deionized water are added and the resulting solution is mixed at room temperature for about 60 minutes while 1 cubic foot of a damp strong base anion-exchange resin, desirably Ionac ASB-1 in the chloride form, in the conventional form of beads or granules, is added during the mixing step. Upon completion of the mixing step, the mixture is allowed to stand quiescently for about 16 to 20 hours. Washing is then carried out with about 4 to 5 gallon volumes of deionized water. The foregoing ratio of weights is based upon the milliequivalent wet exchange capacity of the resin. The resin used in this example is one having 1.44 meq/ml. This formulation results in a polyhalide complex of iodine and bromine ions.

In the foregoing Example 1, the ratios of the ingredients utilized in the preparation of the novel polyhalide bacteriocidal strong base anion-exchange resins made and utilized in accordance with my present invention are as follows:

| | Ratios | | |
|---|---|---|---|
| Iodine | 0.517 | 22.75 p | 220 g |
| KBr | 0.045 | 1.98 p | 20 g |
| KI | 0.225 | 9.90 p | 100 g |
| H$_2$O | 0.071 | 4.94 p | 50 g |
| Starting Resin | 1 | 1 Cft | 0.6 Liter |

Notes:
p = pounds
L = liters
1 = Cft Resin weight 44 pounds
0.6 L Resin weighs 425 grams

EXAMPLES 2–14, inclusive

The following Examples are carried out in the manner described in Example 1, using the herein stated proportions of the specified ingredients:

| | 2 | 3 | 4 | 5 | 6 | 7 |
|---|---|---|---|---|---|---|
| Iodine | 230 g | 230 g | 200 g | 210 g | 220 g | 220 g |

-continued

|  | | | | | | |
|---|---|---|---|---|---|---|
| KBr | 20 g | 10 g | 20 g | 20 g | 20 g | 30 g |
| KI | 120 g | 110 g | 100 g | 100 g | 100 g | 100 g |
| H$_2$O | 50 g | 50 g | 50 g | 50 g | 50 g | 50 g |
| Starting Resin | 0.6 L | 0.6 L | 0.6 L | 0.6 L | 0.6 L | 0.6 L |

|  | 8 | 9 | 10 | 11 | 12 | 13 | 14 |
|---|---|---|---|---|---|---|---|
| Iodine | 215 g | 225 g | 220 g | 220 g | 220 g | 220 g | 220 g |
| KBr | 20 g | 20 g | 10 g | 15 g | 20 g | 25 g | 20 g |
| KI | 100 g | 100 g | 110 g | 100 g | 100 g | 100 g | 90 g |
| H$_2$O | 50 g | 50 g | 50 g | 50 g | 60 g | 50 g | 50 g |
| Starting Resin | 0.6 L | 0.6 L | 0.6 L | 0.6 L | 0.6 L | 0.6 L | 0.6 L |

Notes:
1 Cft Resin weighs 44 pounds
0.6 L Resin weighs 425 grams

It will be noted, as pointed out in Example 1, as well as in the additional working Examples, that the ingredients utilized in the preparation of the polyhalide bacteriocidal anion-exchange resins of the present invention are employed in certain ratios by weight to each other. The maintenance of certain ratios of the materials to each other is important in order to achieve the significant improvements which are obtained in accordance with my invention.

Generally speaking, the materials for the production of the iodine/iodide-bromine bromide polyhalide bacteriocidal strong base anion-exchange resins of my invention are used in the following ranges of proportions, by weight:

Elemental Iodine—200–230 g
KBr—10–30 g
Water-soluble iodide salt, particularly KI—90–120 g
H$_2$O—40–60 g
Starting Resin—0.6 to 1L or in reasonable excess of 1L, but, most desirably, less than 1L and most advantageously in the range of about 0.6 to about 0.7L.

with the proviso that the mixture of the elemental iodine, KBr, water-soluble iodide salt and water forms essentially a solid-free and particularly a wholly solid-free solution prior to being contacted with the starting strong base anion-exchange resin.

It will also be noted that on the weight basis, the elemental iodine is in definite excess over the potassium iodide or other water-soluble iodide salt; the potassium iodide or water-soluble iodide salt is in definite excess over the KBr; and that the elemental iodine is in definite excess over the sum of the potassium iodide or other water-soluble iodide salt and the potassium bromide.

Of the foregoing illustrative embodiments of resin compositions made in accordance with my invention, Example 1 represents the best embodiment, overall, of which I am presently aware. The other Examples represent suitable and operable embodiments of resin compositions which are useful in the practice of my invention and represent improvements over bacteriocidal resins which have heretofore been known to the art.

Comparative tests were run with the bacteriocidal resin of Example 1 of the present invention with what, so far as I am aware, is the best embodiment, or at least a particularly preferred embodiment, of a bacteriocidal triiodide resin made in accordance with the aforementioned U.S. Pat. No. 3,817,860. The latter resin is made in accordance with the teachings, utilizing 220 g of elemental iodine, 140 g of potassium iodide, and 70 g of deionized water, mixed together to form a solid-free solution, and then contacting said solution with 1 liter of a strong base anion-exchange resin, in usual damp form and in the form of granular particles or beads, followed by washing with distilled water prior to use for the treatment of bacteria-contaminated water.

Using a flow rate of 5 liters/minute through a 100 ml bed of the said resin of U.S. Pat. No. 3,817,860, water-effluents with residual iodine-iodide in the range of 0.8 to 1.3 mg/L were obtained in a series of such tests. Carrying out the same tests under the same conditions but using, instead, the bacteriocidal resin of Example 1 of the present application resulted in water effluents having a total halogen residual (iodine+bromine and ions) of less than 0.2 mg/L.

In another series of tests, using in one case the same bacteriocidal resin as that described above of U.S. Pat. No. 3,817,860, and, in the other case, the bacteriocidal resin of Example 1 of the present application, and the same 100 ml bed and the same bacteria-contaminated water, but using a flow rate of 1 liter/minute, the bacteriocidal resin of U.S. Pat. No. 3,817,860 produced an effluent with 2.8 mg/L of iodine/iodide; whereas, with the bacteriocidal resin of Example 1 of the present application, an effluent was produced with a halogen residual (iodine+bromine and ions) of 0.4 mg/L.

The exact reasons for and the mechanism accounting for the materially improved results which are achieved by the practice of my present invention have not been elucidated and are not fully understood other than an unknown complex of predetermined proportions of iodine and bromine is produced and apparently occupies ion exchange sites of the starting strong base anion-exchange resins. The mere incorporation, broadly, of bromine and/or bromides with iodine and/or iodides, to the extent that such may be suggested in U.S. Pat. Nos. 4,187,183 and 4,190,529, for the production of bacteriocidal resins generally is ineffective and, in most instances, is inoperative to produce the results achieved by my present invention. Indeed, these U.S. patents make specific reference to utilizing, in an after-treatment step, the use of unloaded anion-exchange resins for scavenging water-effluents to remove liberated iodine or bromine from water treated by the bacteriocidal resins disclosed in said patents. The use of such scavenging procedures has not been found to be necessary in the normal and usual practice of my invention.

The strong base anion-exchange resins which are used as starting materials for the preparation of the polyhalide bacteriocidal resins of the present invention are well known to the art and are disclosed, by way of illustration, in the patents referred to above, the disclosures with respect to which are incorporated herein by reference. Particularly preferred are those which contain quaternary ammonium groups. It will be understood, of course, that identical results are not obtained with the various strong base anion-exchange resins which are used as starting resins, but, generally speaking, utilizing the teachings of my present invention, improvements will normally be obtained to a reasonably appreciable extent over practices of the prior art as exemplified by the aforesaid patents and published articles. While the starting strong base anion-exchange resins are gnerally usable in the form of their sulfates or chlorides, it is usually preferable to employ them in their chloride form. Ionac ASB-1 has been found to be particular satisfactory in the practice of my present invention, but numerous other strong base anion-exchange resins such as are disclosed, for instance, in the aforesaid patents can be used very effectively.

I claim:

1. A method for the preparation of polyhalide bacteriocidal resins comprising admixing a strong base anion-exchange resin having ion exchange sites with an essentially solid-free aqueous solution of elemental iodine, potassium iodide, and potassium bromide, the elemental iodine being present in proportions, by weight, substantially exceeding that of the potassium iodide, and the potassium iodide being present in proportions, by weight, substantially exceeding that of the potassium bromide, and the elemental iodine being present in proportions exceeding the sum of the amounts of the potassium iodide and the potassium bromide, the materials used in the preparation of said polyhalide bacteriocidal resin being in the ratios represented by the following:

Elemental iodine—200–230 g
KBr—10–30 g
Potassium iodide—90–120 g
$H_2O$—40–60 g
Starting strong base anion-exchange resin—0.6 L whereby to produce a resin having attached to a predominant number of such sites a complex of iodine and bromine ions.

2. A method for the preparation of polyhalide bacteriocidal resins comprising admixing a strong base anion-exchange resin having ion exchange sites with an essentially solid-free aqueous solution of elemental iodine, potassium iodide, and potassium bromide, the elemental iodine being present in proportions, by weight, substantially exceeding that of the potassium iodide, and the potassium iodide being present in proportions, by weight, substantially exceeding that of the potassium bromide, and the elemental iodine being present in proportions exceeding the sum of the amounts of the potassium iodide and the potassium bromide, the materials used in the preparation of said polyhalide bacteriocidal resins being in the following approximate ratios:

Elemental iodine—0.517
KBr—0.045
KI—0.225
$H_2O$—0.071
Starting strong base anion-exchange resin—1 whereby to produce a resin having attached to a predominant number of such sites a complex of iodine and bromine ions.

3. A polyhalide bacteriocidal resin comprising a strong base anion-exchange resin having ion exchange sites and having attached to a predominant number of such sites a complex of iodine and bromine ions resulting from admixing said strong base anion-exchange resin with an essentially solid-free aqueous solution of elemental iodine, potassium iodide, and potassium bromide in a relationship to each other, by weight, of the elemental iodine being present in proportions substantially exceeding that of the potassium iodide, the potassium iodide substantially exceeding that of the potassium bromide, and the elemental iodine exceeding the sum of the amount of the potassium iodide and the potassium bromide, the materials used in the preparation of said polyhalide bacteriocidal resins being in the ratios represented by the following:

Elemental iodine—200–230 g
KBr—10–30 g
Potassium iodide—90–120 g
$H_2O$—40–60 g
Starting strong base anion-exchange resin—0.6 L.

4. A polyhalide bacteriocidal resin comprising a strong base anion-exchange resin having ion exchange sites and having attached to a predominant number of such sites a complex of iodine and bromine ions resulting from admixing said strong base anion-exchange resin with an essentially solid-free aqueous solution of elemental iodine, potassium iodide, and potassium bromide in a relationship to each other, by weight, of the elemental iodine being present in proportions substantially exceeding that of the potassium iodide, the potassium iodide substantially exceeding that of the potassium bromide, and the elemental iodine exceeding the sum of the amount of the potassium iodide and the potassium bromide, the materials used in the preparation of said polyhalide bacteriocidal resins being in the following approximate ratios:

Elemental iodine—0.517
KBr—0.045
KI—0.225
$H_2O$—0.071
Starting strong base anion-exchange resin—1.

* * * * *